United States Patent
Chen et al.

(10) Patent No.: US 12,513,315 B2
(45) Date of Patent: Dec. 30, 2025

(54) METHOD AND ELECTRONIC DEVICE FOR ILLUMINATION COMPENSATION

(71) Applicant: SHARP KABUSHIKI KAISHA, Sakai (JP)

(72) Inventors: Chih-Yuan Chen, Taipei (TW); Chih-Yu Teng, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/857,001

(22) PCT Filed: Apr. 14, 2023

(86) PCT No.: PCT/CN2023/088472
§ 371 (c)(1),
(2) Date: Oct. 15, 2024

(87) PCT Pub. No.: WO2023/198203
PCT Pub. Date: Oct. 19, 2023

(65) Prior Publication Data
US 2025/0274593 A1    Aug. 28, 2025

Related U.S. Application Data

(60) Provisional application No. 63/331,148, filed on Apr. 14, 2022.

(51) Int. Cl.
*H04N 19/196* (2014.01)
*H04N 19/105* (2014.01)
(Continued)

(52) U.S. Cl.
CPC ......... *H04N 19/196* (2014.11); *H04N 19/105* (2014.11); *H04N 19/139* (2014.11); *H04N 19/52* (2014.11)

(58) Field of Classification Search
CPC .. H04N 19/196; H04N 19/105; H04N 19/139; H04N 19/52
(Continued)

(56) References Cited

U.S. PATENT DOCUMENTS

2024/0205425 A1* 6/2024 Zhang .................. H04N 19/105
2025/0267297 A1* 8/2025 Naser ................... H04N 19/103

OTHER PUBLICATIONS

Muhammed Coban et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021.
(Continued)

*Primary Examiner* — Allen C Wong
(74) *Attorney, Agent, or Firm* — ScienBiziP, P.C.

(57) ABSTRACT

A non-transitory machine-readable medium of an electronic device storing computer-executable instructions for decoding a bitstream is provided. The computer-executable instructions, when executed by a processor of the electronic device, cause the electronic device to receive an image frame of the bitstream; determine a first mode from a plurality of local illumination compensation (LIC) modes; determine a first template of a block unit of the image frame and at least one second template of at least one reference block based on the first mode; determine a first model based on the first template and the at least one second template; obtain a slope adjustment parameter; adjust the first model based on the slope adjustment parameter; and modify a prediction illumination of the block unit of the image frame based on the adjusted first model.

18 Claims, 13 Drawing Sheets

(51) Int. Cl.
*H04N 19/139* (2014.01)
*H04N 19/52* (2014.01)

(58) Field of Classification Search
USPC .................................................. 375/240.02
See application file for complete search history.

(56) References Cited

OTHER PUBLICATIONS

Benjamin Bross et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.

Benjamin Bross et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by teleconference, Oct. 7-16, 2020.

Jianle Chen et al., "Algorithm description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020.

\* cited by examiner

Determining the number of template lines — S810

Fetching motion information of a sub-block unit containing the middle sample of the block unit — S1310

METHOD AND ELECTRONIC DEVICE FOR ILLUMINATION COMPENSATION

CROSS-REFERENCE TO RELATED APPLICATION(S)

The present disclosure is a National Stage Application of International Patent Application Serial No. PCT/CN2023/088472, filed on Apr. 14, 2023, which claims the benefit of and priority to U.S. Provisional Patent Application Ser. No. 63/331,148, filed on Apr. 14, 2022, the contents of all of which are hereby incorporated herein fully by reference in their entirety for all purposes.

TECHNICAL FIELD

The present disclosure generally relates to video coding, and more particularly, to a method and an electronic device for illumination compensation.

BACKGROUND

FIG. 1A is a schematic diagram that illustrates Linear model compensation (LIC). Referring to FIG. 1A, LIC is an inter prediction technique to model local illumination variation between a current block of a block unit and its prediction block (e.g., a reference block). A function may be determined based on the modeling between the current block template and the reference block template.

However, in the legacy enhanced compression model (ECM) implementation, only one linear model is used for the LIC and the flexibility of the linear model may be limited, which may not be ideal. Besides, the current block template and the reference block template may be noisy or may not well represent the correlation between the current block and the reference block.

SUMMARY

The present disclosure is directed to a method and an electronic device for illumination compensation.

According to one or more exemplary embodiments of the present disclosure, a method for illumination compensation is provided. The method may be used by an electronic device. The method receives an image frame of a bitstream. The method determines a first mode from multiple local illumination compensation (LIC) modes. The method determines a first template of a block unit of the image frame and at least one second template of at least one reference block based on the first mode. The method determines a first model based on the first template and the at least one second template. The method modifies a prediction of illumination of the block unit of the image frame based on the first model.

According to one or more exemplary embodiments of the disclosure, an electronic device including a memory and a processor is provided. The memory stores one or more computer-executable instructions. The processor is coupled to the memory. The processor is configured to execute the computer-executable instructions to: receive an image frame of a bitstream; determine a first mode from multiple local illumination compensation (LIC) modes; determine a first template of a block unit of the image frame and at least one second template of at least one reference block based on the first mode; determine a first model based on the first template and the at least one second template; and modify a prediction of illumination of the block unit of the image frame based on the first model.

BRIEF DESCRIPTION OF THE DRAWINGS

Aspects of the present disclosure are best understood from the following detailed disclosure and the corresponding figures. Various features are not drawn to scale, and dimensions of various features may be arbitrarily increased or reduced for clarity of discussion.

DETAILED DESCRIPTION

Figure 1A:
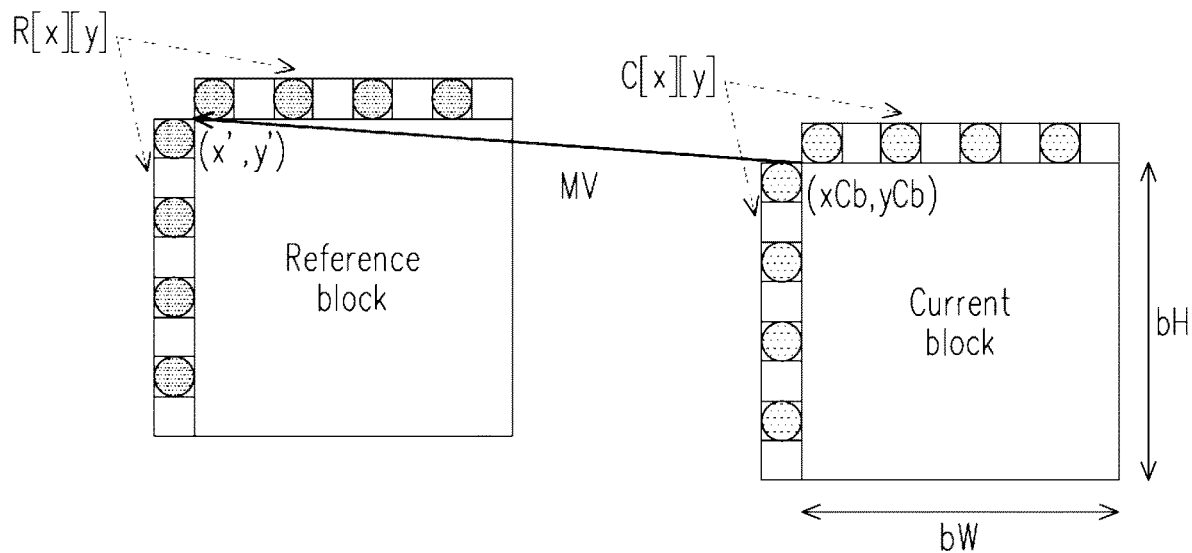
FIG. 1A is a schematic diagram that illustrates Linear model compensation (LIC).

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the implementations described herein. Alterations and further modifications of the inventive features illustrated here, and additional applications of the principles of the inventions as illustrated here, which would occur to one skilled in the relevant art and having possession of this disclosure, are to be considered within the scope of the invention.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The connection may include, but is not limited to, mechanical, electrical, and magnetic connections. The term "comprising" means "including, but not necessarily limited to"; it specifically indicates open-ended inclusion or membership in a so-described combination, group, series, and the like.

The implementations shown and described in this disclosure are only examples. Even though numerous characteristics and advantages of the present technology have been set forth in this disclosure, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Persons skilled in the art will immediately recognize that any coding function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other types of storage devices. For example, one or more microprocessors or general-purpose computers with communication processing capability may be programmed with corresponding executable instructions and carry out the described coding function(s) or algorithm(s). The microprocessors or general-purpose computers may be formed of Application-Specific Integrated Circuits (ASICs), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random-Access Memory (RAM), Read-Only Memory (ROM), Erasable Programmable Read-Only Memory (EPROM), Electrically-Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

Figure 1B:
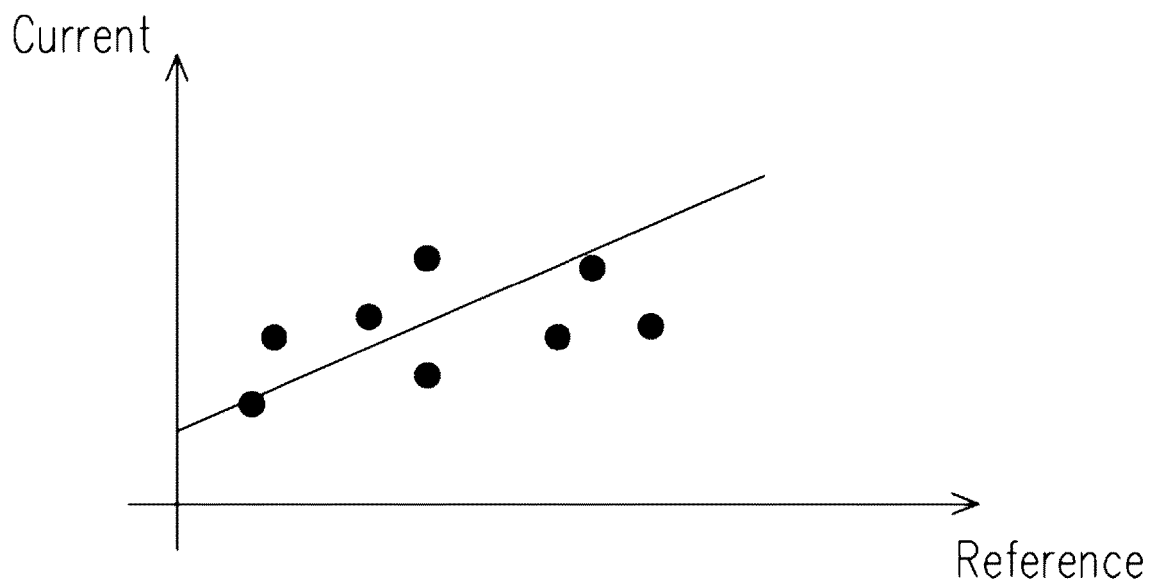
FIG. 1B is a schematic diagram that illustrates a linear model.

FIG. 1B is a schematic diagram that illustrates a linear model. Referring to FIGS. 1A and 1B, the parameters of the function may be represented by a scaling factor $\alpha$ and an offset $\beta$, which forms a linear model, that is, $\alpha*p[x][y]+\beta$ to compensate illumination changes, where $p[x][y]$ is a reference sample at position (x, y) pointed by a motion vector MV in a reference block, and the scaling factor $\alpha$ and the offset $\beta$ may also be called LIC parameters. The block may be a coding unit (CU), a prediction unit (PU), a macro block (MB), or other units used to reconstruct/predict the block.

In the legacy ECM implementation, current block template and reference block template may be used to derive the LIC parameters, as shown in FIG. 1A, where the template may include the template regions above and left to the current/reference block. In this disclosure, a template region represents a rectangle region of a template above/left to the current/reference block. An illumination variation between the current block template and the reference block template may be modeled as a function with two parameters $\alpha$ and $\beta$ as shown in FIG. 1B, where $\alpha$ is a scaling factor and $\beta$ is an offset.

In some implementations, to derive the scaling factor and the offset, a least mean squares (LMS) method may be used to compute the scaling factor and the offset. The scaling factor may be calculated as follows:

$$\alpha = \frac{N \times \sum_{i=1}^{N} Ref_i Cur_i - \sum_{i=1}^{N} Ref_i \sum_{i=1}^{N} Cur_i}{N \times \sum_{i=1}^{N} (Ref_i)^2 - \left(\sum_{i=1}^{N} Ref_i\right)^2} \quad (1)$$

and the offset may be calculated as follows.

$$\beta = \frac{\sum_{i=1}^{N} Cur_i - \alpha \sum_{i=1}^{N} Ref_i}{N} \quad (2)$$

where N may be the number of samples in the current/reference block template, $Ref_i$ may be the $i^{th}$ sample in the reference block template and $Cur_i$ may be the $i^{th}$ sample in the current block template.

Let (xCb, yCb) denote the top-left position of the current block, (x', y') denote the top-left position of the reference block, bW denote the current block width, bH denote the current block height, C[x][y] denote the specific sample of the current block template with position (xCb+x, yCb+y) and R[x][y] denote the specific sample of the reference block template with position (x'+x, y'+y). x and y may be integers.

In some implementations, for the sample positions of the template above the current/reference block used to derive the LIC parameters, x may be in the range from 0 to bW−1 and y may equal to −1; for the sample positions of the template left to the current/reference block used to derive the LIC parameters, x may equal to −1 and y may be in the range from 0 to bH−1. More specifically, the width of the template above the current/reference block may be equal to bW and the height of the template left to the current/reference block may be equal to bH.

In some implementations, all of the samples of the current/reference block template may be used to derive the LIC parameters. In some implementations, only part of the samples of the current/reference block template may be used to derive the LIC parameters. For example, let numSteps denote the number of the samples of the template above or left to the current/reference block used to derive the LIC parameters, sT[k] denote the $k^{th}$ sample position of the template above the current/reference block used to derive the LIC parameters, sL[k] denote the $k^{th}$ sample position of the template left to the current/reference block used to derive the LIC parameters, where k may range from 0 to numSteps−1, then sT[k] and sL[k] may be derived as follows:

$$sT[k] = (k*bW) \gg \log_2(numSteps) \qquad (3)$$

$$sL[k] = (k*bH) \gg \log_2(numSteps) \qquad (4)$$

e.g., for the samples of the template above the current and reference block used to derive the LIC parameters, they may be, respectively, denoted by C[sT[k]][−1] and R[sT[k]][−1] for the samples of the template left to the current and reference block used to derive the LIC parameters, they may be, respectively, denoted by C[−1][sL[k]] and R[−1][sL[k]].

In the legacy ECM implementation, in a derivation process of a and $, inputs to the process are: a sum of samples of a reference block template: sumR, a sum of samples of the current block template: sumC, a sum of multiplied samples of a reference block template: sumRR, a sum of multiplied samples of the current block template and a reference block template: sumRC, the base-2 logarithm of the number of samples of current/reference block template: cntShift, and a variable cIdx specifying the colour component index; outputs of the process are a scaling factor α and an offset β.

In some implementations, LIC may be applied to both luma and chroma components. In some implementations, LIC may be applied to only luma component. In some implementations, LIC may be applied to only chroma components.

In some implementations, LIC may be applied to inter mode, including affine mode. In some implementations, LIC may be applied to bi-prediction.

In some implementations, LIC that is applied to bi-prediction may be based on Bi-prediction with CU-level weight (BCW) index.

In some implementations, an iterative approach may be applied to alternately derive the L0 and L1 linear models. Specifically, given the two MVs of the current block, let $T_0$ denote the reference block template of L0, $T_1$ denote the reference block template of L1, and T denote the current block template. The iterative approach firstly may derive the LIC parameters ($α_0$ and $β_0$) of L0 that may result in the minimum difference between $T_0$ and T. Then, the LIC parameters ($α_1$ and $β_1$) of L1 may be calculated that minimizes the difference between $T_1$ and the updated current template. Finally, the LIC parameters of L0 may be refined again in the same way.

The bi-prediction of the current block after LIC adjustment may be calculated as the combination of two uni-prediction blocks after the LIC adjustment, e.g., $$P'[x, y] = (1-\omega) \cdot p'_0[x, y] + \omega \cdot p'_1[x, y] \qquad (5)$$

-continued
wherein $$p'_0[x, y] = \alpha_0 * P_0[x, y] + \beta_0 \qquad (6)$$

$$p'_1[x, y] = \alpha_1 * P_1[x, y] + \beta_1 \qquad (7)$$

$P_0$ and $P_1$ may, respectively, indicate the original predictions in L0 and L1, $p'_0$ and $p'_1$ may, respectively, indicate the predictions after LIC adjustment in L0 and L1, and ω may indicate the weight (as indicated by the block level BCW index) that may be applied when combining the two uni-prediction blocks.

In some implementations, LIC may only be applied to uni-prediction. In some implementations, the encoder/decoder module may enable overlapped block motion compensation (OBMC) to the inter blocks where the LIC is applied.

In some implementations, LIC may be disabled for the current block with less than N samples, where N may be a positive integer.

Since α and β may be derived based on current block template and reference block template, no signaling overhead may be required for α and β, except that an LIC flag may be signaled for AMVP mode to indicate the use of LIC.

Figure 2:
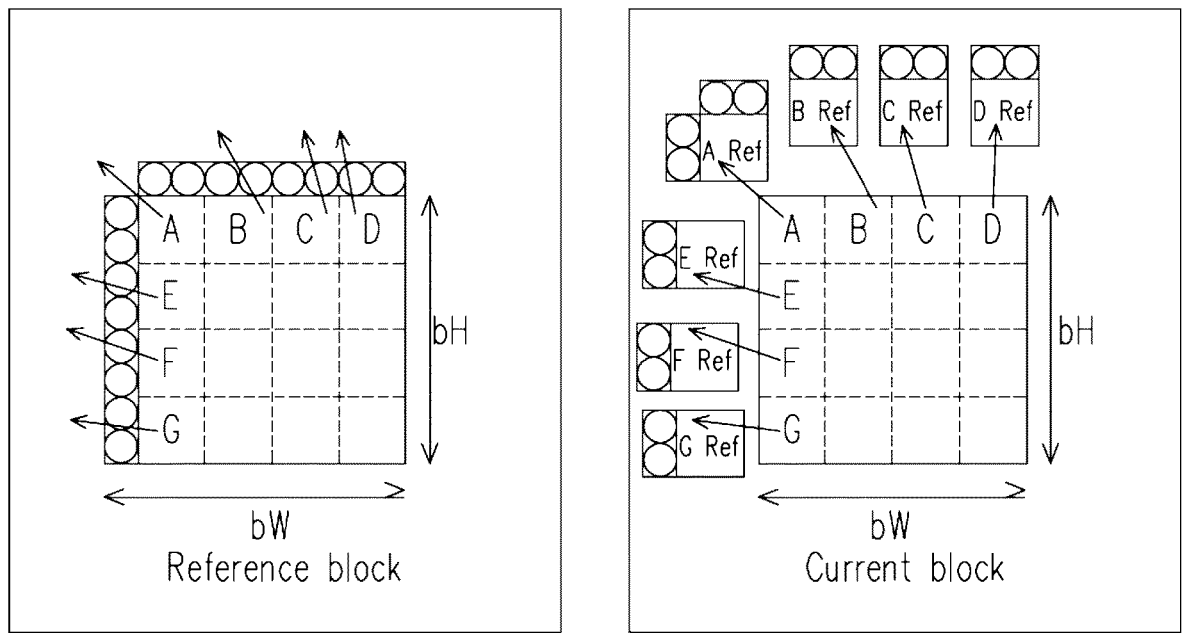
FIG. 2 is a schematic diagram that illustrates subblock mode LIC templates.

In the legacy ECM implementation, for affine mode, fetching the LIC reference template is based on the motion information (motion vector and/or reference index) of those subblocks located at the top boundary and left boundary of the current block. FIG. 2 is a schematic diagram that illustrates subblock mode LIC templates. Each reference subblock pointed by motion vector MV of the subblock located at the top boundary and/or left boundary of the current block has its corresponding reference sub-template. In other words, the reference block template may be divided into multiple so-called "sub-templates," as shown in FIG. 2. For example, "A Ref," "B Ref," "C Ref," "D Ref," "E Ref," "F Ref," and "G Ref" are reference subblocks, and each reference subblock has its sub-templates located at the top and/or the left. For the sub-templates above the reference block, the width of each sub-template may be equal to bW divided by the number of the subblock in the top boundary of the reference block. For the sub-templates left to the reference block, the height of each sub-template may be equal to bH divided by the number of the subblock in the left boundary of the reference block.

For subblock-based temporal motion prediction (SbTVP), because LIC information (e.g., LIC flag) may not be stored in the motion buffer of the reference picture, LIC may not be used for SbTVP.

However, the flexibility of the conventional LIC is limited to a single linear model, a fixed slope, fixed locations of reference block templates, and a single LIC mode. Therefore, there are several LIC improvement methods being proposed, including slope adjustment for LIC linear model, multiple linear model modeling, multiple template line selection and multiple LIC modes. The methods mentioned above may be independent of each other without departing from this disclosure. A method of fetching subblock mode LIC reference template is also proposed.

A decoder module of an electronic device receives an image frame of a bitstream. For example, the electronic device may receive the bitstream from an encoder (e.g., another electronic device including an encoding module or other processors). The bitstream may include one or more image frames.

The linear model for LIC may be derived by using LMS method. However, the linear model may not be the optimal one due to the noise coming from the current block template and the reference block template. Thus, slope adjustment for the linear model may be needed.

Figure 3:
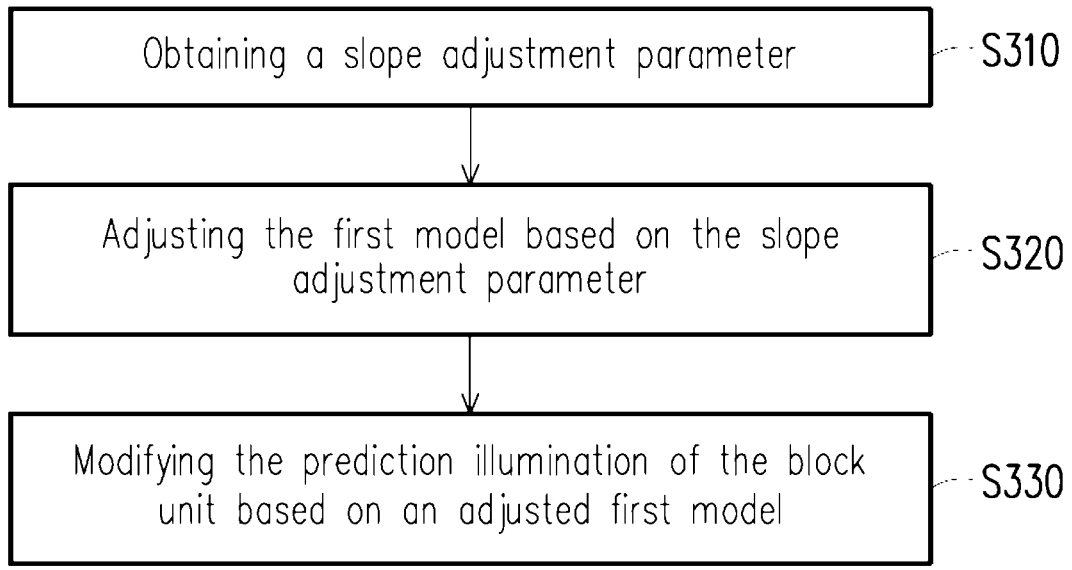
FIG. 3 is a flowchart illustrating a slope adjustment method/process for LIC, in accordance with one or more example implementations of the present disclosure.

FIG. 3 is a flowchart illustrating a slope adjustment method/process for LIC, in accordance with one or more example implementations of the present disclosure. Referring to FIG. 3, a decoder module obtains a slope adjustment parameter (step S310). The decoder module adjusts a first model based on the slope adjustment parameter (step S320).

Figure 4:
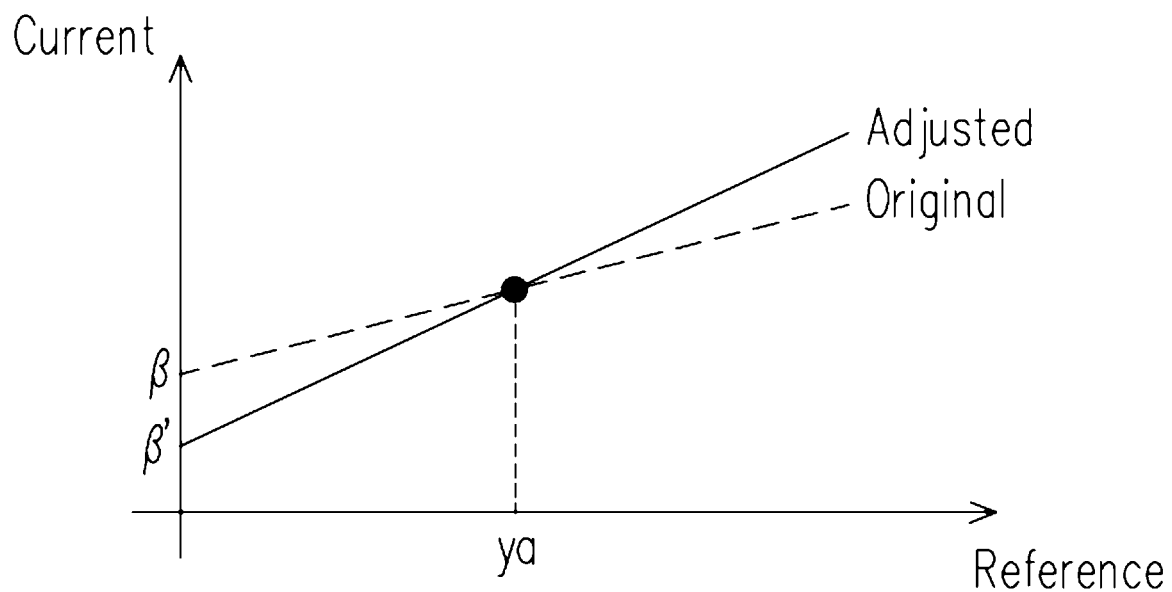
FIG. 4 is a schematic diagram that illustrates a slope adjustment linear model, in accordance with one or more example implementations of the present disclosure.

FIG. 4 is a schematic diagram that illustrates a slope adjustment linear model, in accordance with one or more example implementations of the present disclosure. In some implementations, as shown in FIG. 4, the slope of the linear model may be adjusted by using another parameter γ (known as the slope adjustment parameter), with the linear model rotated around the point $y_a$, where $y_a$ may be the average value of the samples' values of the reference block template. The original LIC linear model (e.g., the first model used for the image frame) used to compensate illumination changes may be described as follows:

$$p'[x][y] = \alpha * p[x][y] + \beta \quad (8)$$

where p[x][y] is a reference sample at position (x, y) and p'[x][y] is the compensated sample of p[x][y]. The slope adjustment linear model (e.g., an adjusted first model) may be described as follows:

$$p'[x][y] = \alpha' * p[x][y] + \beta'$$

where $\alpha' = \alpha + \gamma$ and $\beta' = \beta - \gamma * y_a$.

In some implementations, the slope adjustment parameter γ may be an integer. In some implementations, the slope adjustment parameter γ may be a decimal. In some implementations, the slope adjustment parameter γ may be within a range. In some implementations, the slope adjustment parameter γ may belong to a finite set. For example, $\{\gamma | \gamma \in \mathbb{Z}, -4 \leq \gamma \leq 4\}$.

In some implementations, to determine the value of the slope adjustment parameter γ, at the encoder side (e.g., an encoder module of another electronic device or other processors), a cost may be calculated for each possible γ by using the original current block (The original current block is divided from the input picture) and the prediction of the current block after compensated (e.g., after the prediction stage and LIC stage). In some implementations, the cost may be calculated based on a cost function. In some implementations, the cost function may be one of sum of absolute difference (SAD), sum of absolute transformed difference (SATD), sum of squared error (SSE) and rate distortion (RD) cost. Any cost function may be used to calculate the cost without departing from this disclosure. After calculating the cost for each possible γ, the value of γ which results in a minimum cost may be chosen as the final slope adjustment parameter. The final slope adjustment parameter may be encoded into a bitstream.

In some implementations, an LIC flag may be signaled in the block level in the bitstream (for advanced motion vector prediction (AMVP) mode) to indicate whether the LIC is enabled for the block. If the LIC flag (e.g., lic_flag) is equal to 1, a slope adjustment enabled flag may then be signaled in the block level after the LIC flag in the bitstream to indicate whether the slope adjustment for the LIC is enabled for the block. If the LIC flag is equal to 0, the slope adjustment enabled flag and the slope adjustment parameter may not be signaled. If both the LIC flag and the slope adjustment enabled flag are equal to 1, then the slope adjustment parameter (e.g., slope parameter) may be signaled after the slope adjustment enabled flag.

In some implementations, an LIC flag may be signaled in the block level in the bitstream (for AMVP mode) to indicate whether the LIC is enabled for the block. If the LIC flag is equal to 1, the slope adjustment parameter may then be signaled after the LIC flag. If the LIC flag is equal to 0, the slope adjustment parameter may not be signaled after the LIC flag. In some implementations, when the slope adjustment parameter is equal to 0, the slope adjustment method may be disabled.

In some implementations, the slope adjustment parameter may be directly encoded into the bitstream. In some implementations, there may be a predefined array to store the possible values of the slope adjustment parameter. At the encoder side (e.g., the electronic device including the encoder module or other processors), only the index of the array which indicates the selected slope adjustment parameter may be signaled into the bitstream. At the decoder side, the index may be parsed to indicate the selected slope adjustment parameter stored in the array.

Referring to FIG. 3, the encoder module modifies the prediction illumination of one or more block units based on the adjusted first model (step S330). The block unit could be, for example, a CU, a PU, an MB, or other units used to reconstruct/predict the block. Instead of prediction illumination based on the first model (e.g., a linear model configured with equation (8)), the adjusted first model (e.g., another linear model configured with equation (9)) may be used to predict the illumination of one or more block units. For example, the predicted illumination of a sample in a block unit is p'[x][y] in equation (9).

In some implementations, to further improve the coding efficiency of the LIC, the number of linear models may be increased. The number of linear models may be N, where N may be a positive integer. The samples of the current/reference block template used to derive the LIC parameters may be divided into N groups, with each group having its specific linear model and its specific LIC parameters. That is, there may be N sets of LIC parameters.

Figure 5:
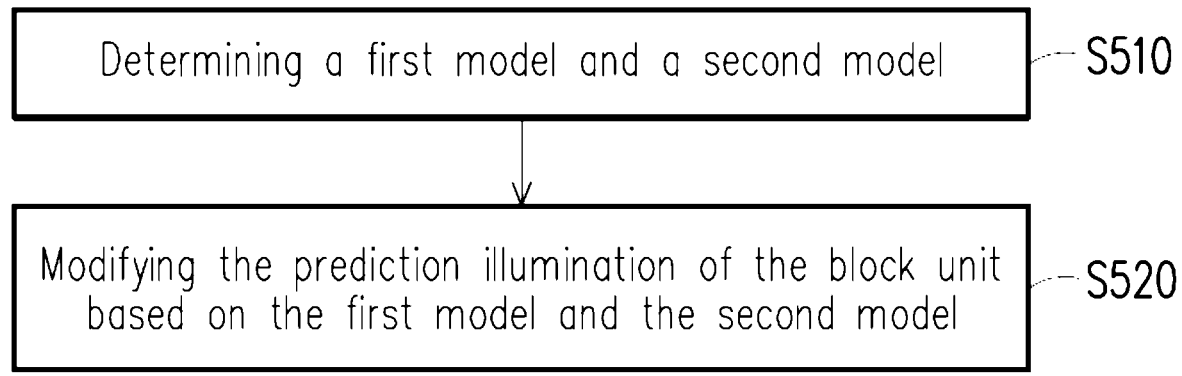
FIG. 5 is a flowchart illustrating a multi-model LIC determination method/process, in accordance with one or more example implementations of the present disclosure.

FIG. 5 is a flowchart illustrating a multi-model LIC determination method/process, in accordance with one or more example implementations of the present disclosure. Referring to FIG. 5, a decoder module determines a first model and a second model (step S510). The second model is configured with the LIC parameters different from the first model. For example, a different scaling factor and/or different offset.

Figure 6:
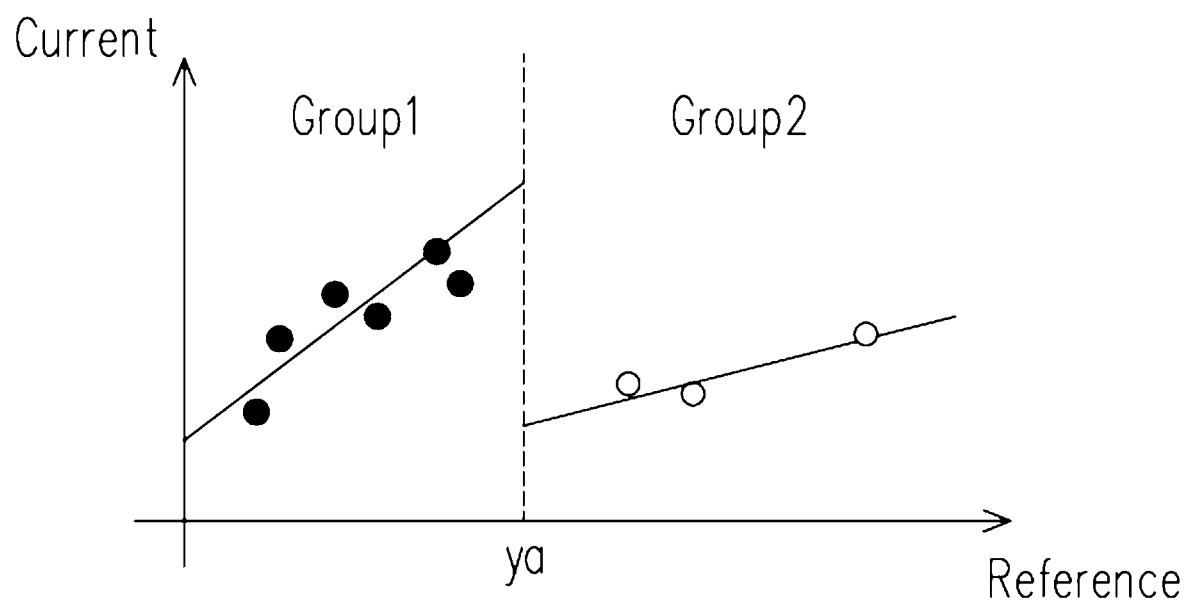
FIG. 6 is a schematic diagram that illustrates two linear models, in accordance with one or more example implementations of the present disclosure.

FIG. 6 is a schematic diagram that illustrates two linear models, in accordance with one or more example implementations of the present disclosure. In some implementations, the samples of the current/reference block template used to derive the LIC parameters may be divided into 2 groups, as shown in FIG. 6. In some implementations, the division of the 2 groups may be based on an average value of the reference samples' values ($y_a$ in FIG. 6), where the reference samples are the samples of the reference block template and the average value is the average of the samples' values of these reference samples. If the sample value R[x][y] is smaller than the average value, the point (R[x][y], C[x][y]) may be classified as Group1 as shown in FIG. 6; if the sample value R[x][y] is greater than or equal to the average value, the point (R[x][y], C[x][y]) may be classified as Group2 as shown in FIG. 6. Then, there may be one linear model with the LIC parameters $\alpha_1$ and $\beta_1$ derived based on the points belonging to Group1 and another linear model with the LIC parameters $\alpha_2$ and $\beta_2$ derived based on the points belonging to Group2.

However, in some implementations, a decoder module may determine more than two models with different LIC parameters. That is, the samples of the current/reference block template used to derive the LIC parameters may be divided into more than two groups.

Figures 7, 8:
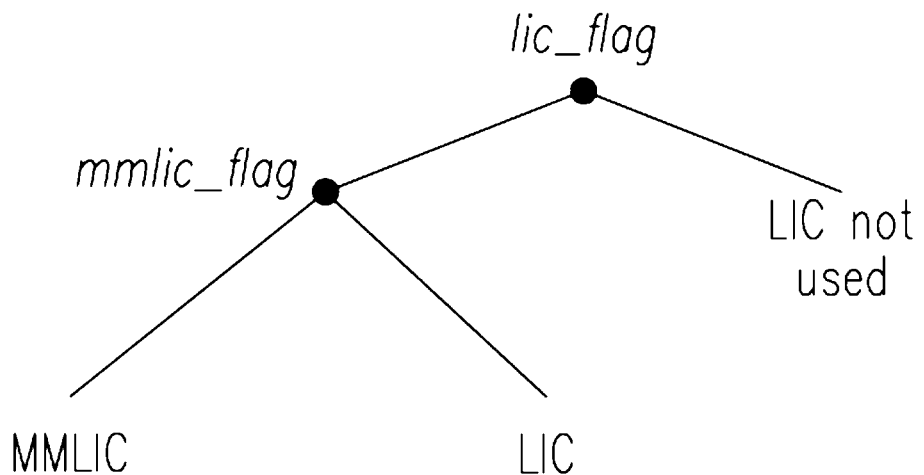
FIG. 7 is a schematic diagram that illustrates signaling flags, in accordance with one or more example implementations of the present disclosure.
FIG. 8 is a flowchart illustrating a multi-template line selection method/process, in accordance with one or more example implementations of the present disclosure.

In some implementations, an LIC flag may be signaled in the block level in the bitstream (for advanced motion vector prediction (AMVP) mode) to indicate whether LIC is enabled for the block. FIG. 7 is a schematic diagram that illustrates signaling flags, in accordance with one or more example implementations of the present disclosure. Referring to FIG. 7, if the LIC flag (e.g., lic_flag) is equal to 1, a multi-model LIC flag (e.g., mmlic_flag) may then be signaled to indicate whether multi-model for LIC is enabled for the block unit. If the LIC flag is equal to 0, the multi-model LIC flag may not be signaled, and it indicates that multi-model is not used/enabled for the block unit. If both the LIC flag and the multi-model LIC flag are equal to 1, then the multi-model for LIC is used/enabled for the block unit. If the LIC flag is equal to 1 but the multi-model LIC flag is equal to 0, then the multi-model is not used/enabled for the block unit but merely single model of LIC may be configured.

In some implementations, a multi-model LIC flag (e.g., mmlic_flag) may be signaled in the block level in the bitstream (for advanced motion vector prediction (AMVP) mode) to indicate whether multi-model for LIC is enabled for the block. Then, one or more slope adjustment parameters (e.g., slope_parameter) may be signaled. If the multi-model LIC flag (e.g., mmlic_flag) is equal to 1, two slope adjustment parameters may then be signaled. If the multi-model LIC flag is equal to 0, one slope adjustment parameter may then be signaled.

In some implementations, the decoder module may determine whether the multi-model is configured for a block unit based on other conditions, such as the size of the block unit. In at least one implementation, the decoder module may determine the size of the block unit based on at least one of the width of the block unit (e.g., width bW as shown in FIGS. 1A and 2) and the height of the block unit (e.g., width bH as shown in FIGS. 1A and 2). For example, if the width of the block unit and/or the height of the block unit is larger than or equal to N1, decoder module may enable the multi-model for LIC without parsing signaled flag related to multi-model. For example, if the width of the block unit and/or the height of the block unit is less than N1, the decoder module may not enable the multi-model for LIC. For example, if the area (e.g., the product of the width and the height of a block unit) is larger than or equal to N2, it implicates enabling of multi-model for LIC, and the decoder module may enable the multi-model for LIC without parsing signaled flag related to multi-model. For example, if the area (e.g., the product of the width and the height of a block unit) is less than N2, the decoder module may not enable the multi-model for LIC.

Referring to FIG. 5, the encoder module modifies the prediction illumination of one or more block units based on the first model and the second model (step S520). For example, the encoder module may determine which group a reference sample belongs to. The predicted illumination of a sample in a block unit may be p'[x][y] in equation (8) with the LIC parameters of the corresponding group.

In the legacy ECM implementation, only nearest samples above and left to the current/reference block are used to derive the LIC parameters, which may be less flexible. In the proposed method of the present disclosure, the above and left side template regions may be extended to contain more lines.

FIG. 8 is a flowchart illustrating a multi-template line selection method/process, in accordance with one or more example implementations of the present disclosure. Referring to FIG. 8, a decoder module determines the number of template lines (step S810). For example, more than one template line in one or two template regions.

Figure 9:
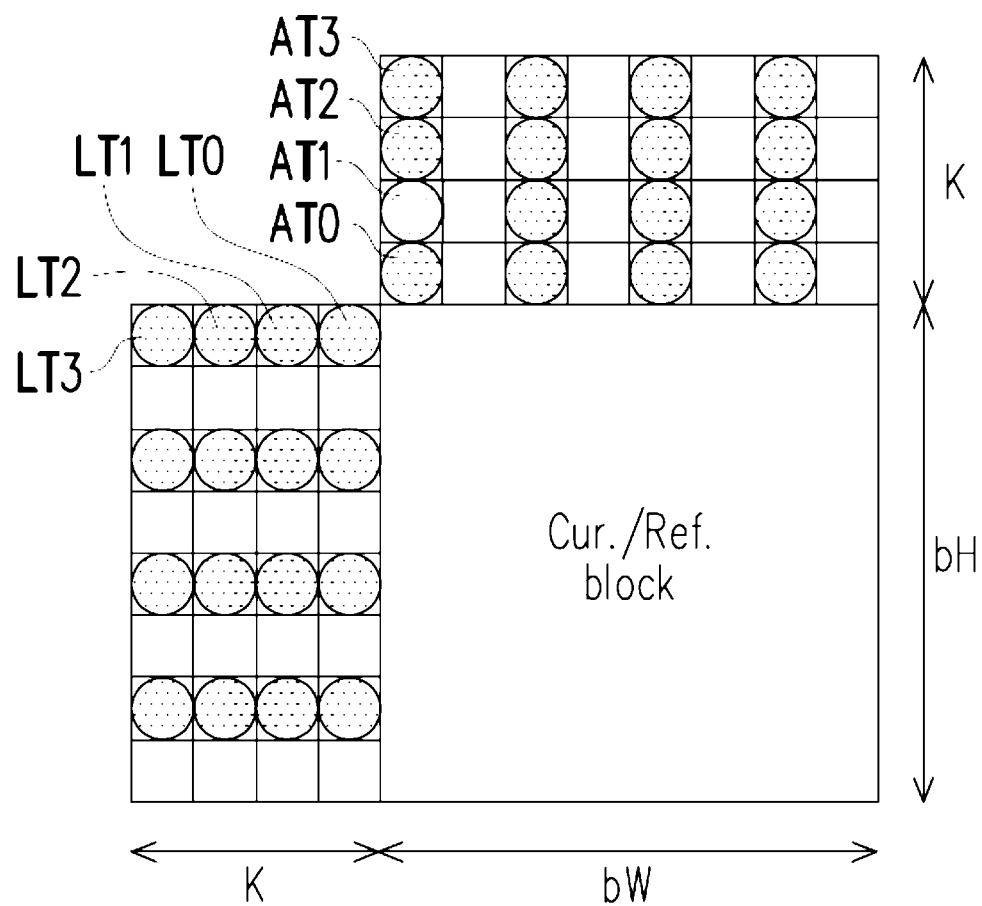
FIG. 9 is a schematic diagram that illustrates multiple template lines, in accordance with one or more example implementations of the present disclosure.

FIG. 9 is a schematic diagram that illustrates multiple template lines, in accordance with one or more example implementations of the present disclosure. In some implementations, the template region may contain multiple template lines. In this disclosure, the length of the side of the template region perpendicular to the side adjacent to the current/reference block is called template size (for example, K in FIG. 9). In some implementations, the template size may be a positive integer.

In some implementations, all of the template lines in the above/left side template region may be used to derive the LIC parameters. Taking FIG. 9 as an example, let AT0 denote the above template line 0, AT1 denote the above template line 1 and so on, let LT0 denote the left template line 0, LT1 denote the left template line 1 and so on, as shown in FIG. 9. If the template size K is equal to 4, the template lines in the above template region used to derive the LIC parameters may contain {AT0, AT1, AT2, AT3} and the template lines in the left side template region used to derive the LIC parameters may contain {LT0, LT1, LT2, LT3}. In the legacy ECM implementation, the template size is equal to 1. In some implementations, the template size may be equal to K, where K may be a positive integer. For example, K is 1, 2 or 4.

In some implementations, only part of the template lines in the above/left side template region may be used to derive the LIC parameters. Taking FIG. 9 as an example, let AT0 denote the above template line 0, AT1 denote the above template line 1 and so on, let LT0 denote the left template line 0, LT1 denote the left template line 1 and so on. If the template size is equal to 4 and only 3 template lines in the above/left side template region is used to derive the LIC parameters, the above template lines may only contain {AT0, AT1, AT3} and the left side template lines may only contain {LT0, LT1, LT3}. For example, if the template size is equal to 4 and only 2 template lines in the above/left side template region are used to derive the LIC parameters, the above template lines may only contain {AT1, AT2} and the left side template lines may only contain {LT1, LT2}. For example, if the template size is equal to 4 and only 1 template line in the above/left side template region is used to derive the LIC parameters, the above template lines may only contain {AT1} and the left side template lines may only contain {LT1}.

In some implementations, template lines to be selected may be predefined in the encoder/decoder module.

In some implementations, template line combinations may be predefined in an array, and an index may be used to indicate which combination to be used.

In the legacy ECM implementation, both the template regions above and left to the current block and those above and left to the reference block may be used to derive the LIC parameters, which may be less flexible. There may need some flexibility to use only the above template region or the left side template region to derive the LIC parameters.

Figure 10:
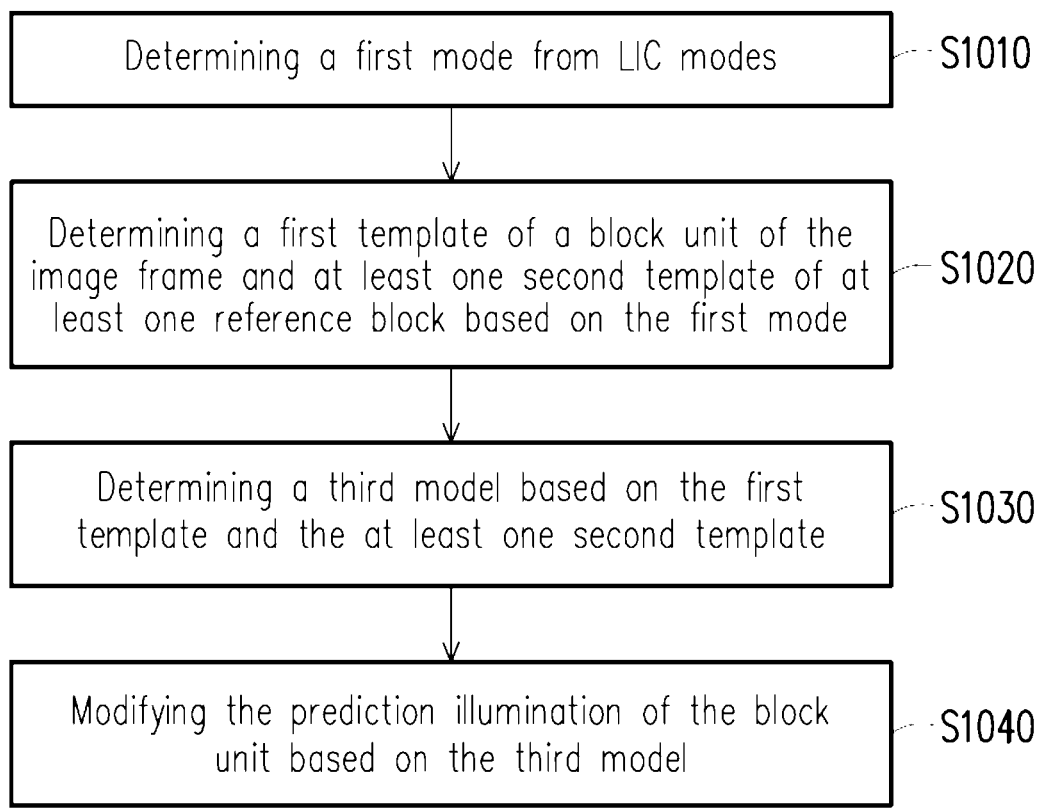
FIG. 10 is a flowchart illustrating a multi-LIC mode selection method/process, in accordance with one or more example implementations of the present disclosure.

FIG. 10 is a flowchart illustrating a multi-LIC mode selection method/process, in accordance with one or more example implementations of the present disclosure. Referring to FIG. 10, a decoder module determines a first mode from multiple LIC modes (step S1010).

Figure 11A:
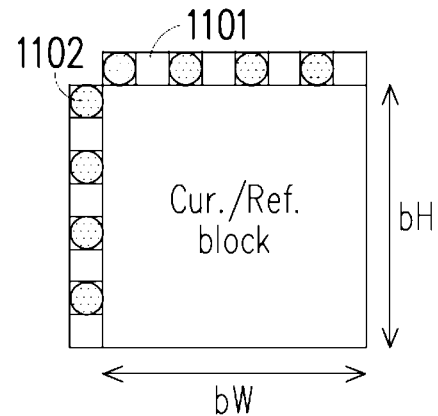
FIGS. 11A-11C are schematic diagrams that illustrate LIC modes, in accordance with one or more example implementations of the present disclosure.
Figure 11B:
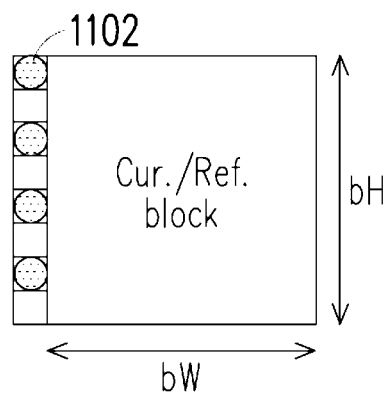
Figure 11C:
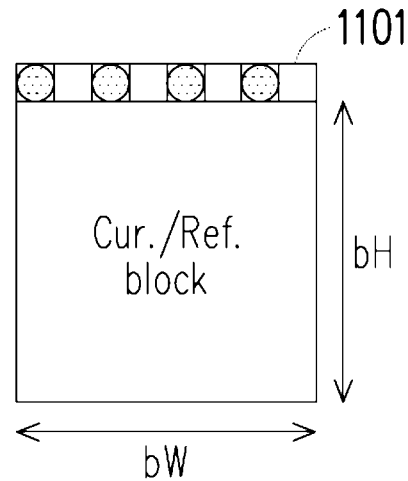

In some implementations, multiple LIC modes are different at locations templates. In some implementations, there may be three possible LIC modes to derive the LIC parameters. FIGS. 11A-11C are schematic diagrams that illustrate LIC modes, in accordance with one or more example implementations of the present disclosure. Referring to FIGS. 11A-11C, the LIC modes include LIC_LT mode, LIC_L mode and LIC_T mode:

- LIC_LT mode: Both the template regions 1101 and 1102 above and left, respectively, to the current block and those above and left to the reference block may be used to derive the LIC parameters as shown in FIG. 11A.
- LIC_L mode: Only the template region 1102 left to the current block and that left to the reference block may be used to derive the LIC parameters, as shown in FIG. 11B.
- LIC_T mode: Only the template region 1101 above the current block and that above the reference block may be used to derive the LIC parameters, as shown in FIG. 11C.
- That is, these LIC modes are different at the locations of templates.

In some implementations, the template regions above and left to the current block and those above and left to the reference block may also be extended.

Figure 12A:
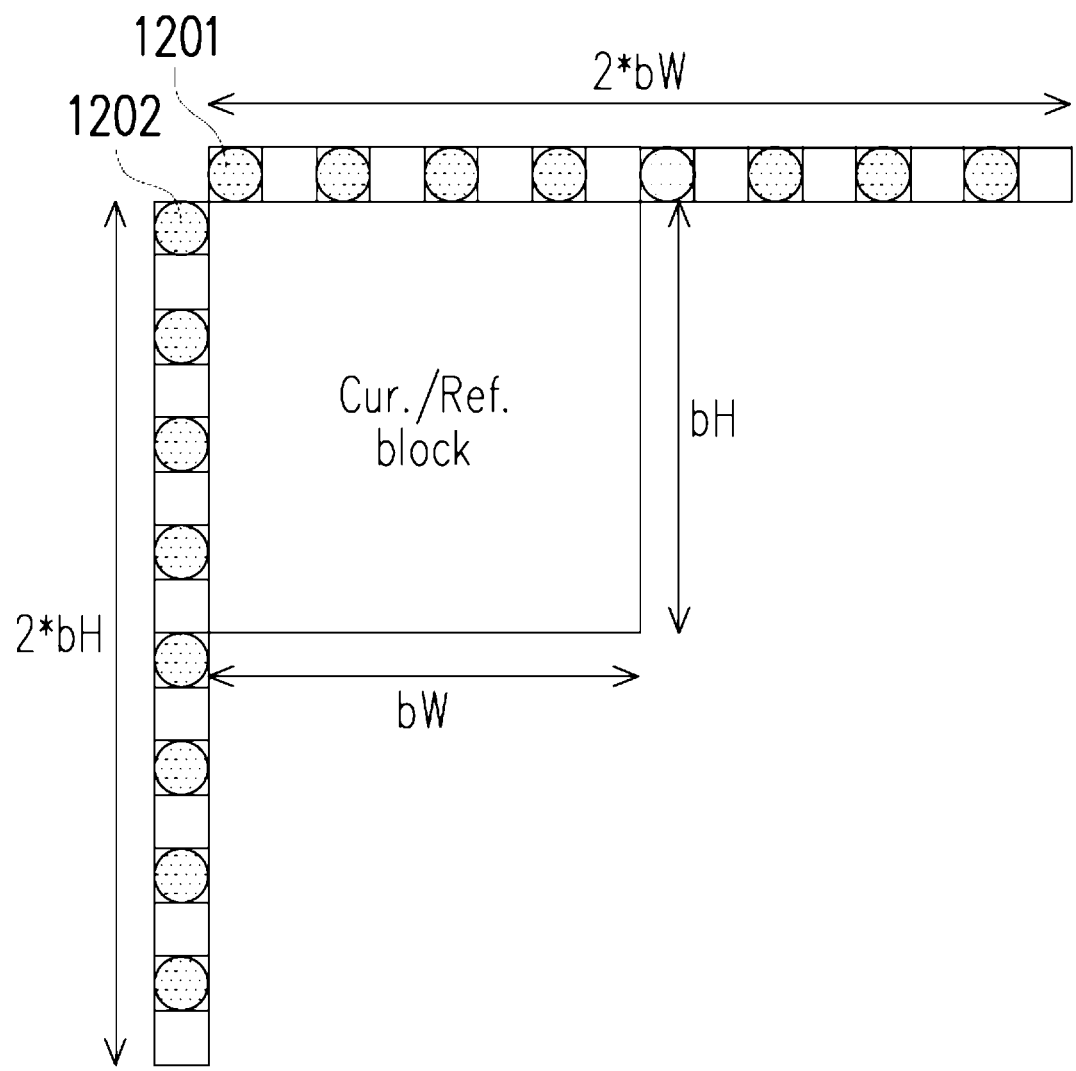
FIGS. 12A-12C are schematic diagrams that illustrate extended template regions, in accordance with one or more example implementations of the present disclosure.
Figure 12B:
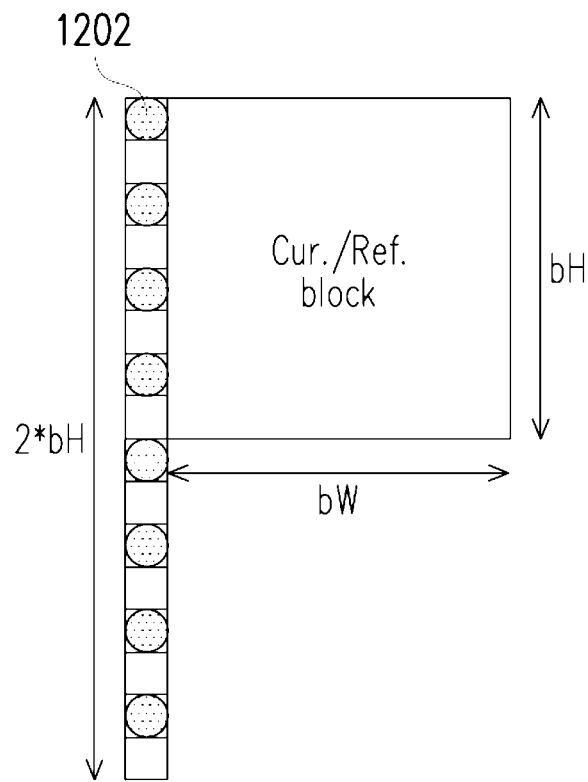
Figure 12C:
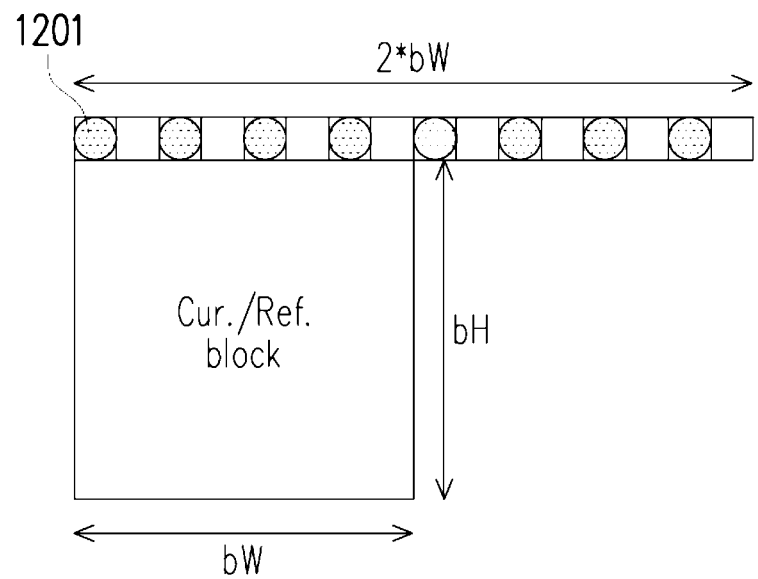

FIGS. 12A-12C are schematic diagrams that illustrate extended template regions, in accordance with one or more example implementations of the present disclosure. In some implementations, there may be three possible LIC modes to derive the LIC parameters. The LIC modes include LIC_LT mode, LIC_T mode and LIC_L mode. The width of the template region 1201 above the current/reference block may be extended to 2*bW when LIC_T mode is applied; and/or the height of the template region 1202 left to the current/reference block may be extended to 2*bH when LIC_L mode is applied, as shown in FIGS. 12A-12C:

- LIC_LT mode: Both the template regions 1201 and 1202 above and left, respectively, to the current block and those above and left to the reference block may be used to derive the LIC parameters, as shown in FIG. 12A.
- LIC_L mode: Only the template region 1202 left to the current block and that left to the reference block may be used to derive the LIC parameters, where the height of the template region 1202 may be extended to 2*bH, as shown in FIG. 12B.
- LIC_T mode: Only the template region 1201 above the current block and that above the reference block may be used to derive the LIC parameters, where the width of the template region 1201 may be extended to 2*bW, as shown in FIG. 12C.
- That is, these LIC modes are different at the locations of templates. Furthermore, compared to the template region 1101 or 1102 of FIGS. 11A-11C, the template region 1201 or 1202 is extended.

In some implementations, the multi-LIC mode selection method may be applied to uni-prediction and/or bi-prediction.

In some implementations, a mode index (e.g., lic_mode_idx) may be signaled in the block level in the bitstream (for advanced motion vector prediction (AMVP) mode) to indicate which LIC mode to be used for the block. The decoder module may receive the mode index and determines the first mode based on the mode index. Table (1) and Table (2) are two examples of mode indices. Taking Table (1) as an example, if the mode index is "0," the LIC_LT mode is indicated; if the mode index is "1," the LIC_L mode is indicated; if the mode index is "2," the LIC_T mode is indicated. Taking Table (2) as an example, if the mode index is "0," the LIC_LT mode is indicated; if the mode index is "1," the LIC_T mode is indicated; if the mode index is "2," the LIC_L mode is indicated.

TABLE 1

| Mode index | Mode |
| --- | --- |
| 0 | LIC_LT |
| 1 | LIC_L |
| 2 | LIC_T |

TABLE 2

| Mode index | Mode |
| --- | --- |
| 0 | LIC_LT |
| 1 | LIC_T |
| 2 | LIC_L |

In some implementations, a mode index (e.g., lic_mode_idx) may be signaled, and then an adjustment parameter (e.g., slope_parameter) may be signaled. No matter which mode index is indicated, the adjustment parameter may then be signaled.

In some implementations, if a mode index (e.g., lic_mode_idx), which indicates the LIC_LT mode, is signaled, an adjustment parameter (e.g., slope parameter) may be signaled.

In some implementations, the decoder module may determine the first mode based on the size of the block unit. In at least one implementation, the decoder module may determine the size of the block unit based on at least one of a width of the block unit and a height of the block unit. For example, if the width of the block unit is larger than the height of the block unit, the first mode is the LIC_T mode; else if the height of the block unit is larger than the width of the block unit, the first mode is the LIC_L mode; else if the height of the block unit is equal to the width of the block unit, the first mode is the LIC_LT mode. Therefore, there is no need to signal mode index.

In some implementations, the decoder module may determine the first mode based on both the size of the block unit and the received mode index. For example, if the width of the block unit is larger than the height of the block unit, the mode index indicates LIC_LT or LIC_T mode; else if the height of the block unit is larger than the width of the block unit, the mode index indicates LIC_LT or LIC_L mode; else if the height of the block unit is equal to the width of the block unit, the mode index indicates LIC_LT, LIC_T, or LIC_L mode.

Referring to FIG. 10, the decoder module determines a first template of a block unit of the image frame and at least one second template of at least one reference block based on the first mode (step S1020). For example, the first mode is LIC_LT mode as shown in FIG. 11A, and the first or the at least one second template may be determined from the template regions 1101 and 1102. For example, the first mode is LIC_L mode as shown in FIG. 11B, and the first or the at least one second template may be determined from the template region 1102. For example, the first mode is LIC_T mode as shown in FIG. 11C, and the first or the at least one second template may be determined from the template region 1101.

Referring to FIG. 10, the decoder module determines a third model based on the first template and the at least one second template (step S1030). For example, illumination variation between the first template and the second template may be modeled as a linear function with a scaling factor and an offset, so as to generate the third model.

Referring to FIG. 10, the decoder module modifies the prediction illumination of the block unit based on the third model (step S1040). That is, the third model may be used to predict the illumination of one or more block units. For example, the predicted illumination of a sample in a block unit is p'[x][y] in equation (9).

In some implementations, the decoder module may obtain a slope adjustment parameter, adjust the third model based on the slope adjustment parameter, and modify the prediction illumination of the block unit based on an adjusted third model. The detailed description could refer to one or more implementations of FIGS. 3 and/or 4 and may be omitted.

In some implementations, the decoder module may determine a fourth model and modify the predication illumination of the block unit based on the third model and the fourth model. The detailed description could refer to one or more implementations of FIGS. 5, 6 and/or 7 and may be omitted.

In some implementations, an LIC flag (e.g., lic_flag) may be signaled in the block level in the bitstream, a mode index (e.g., lic_mode_idx) may then be signaled, and then a multi-model LIC flag (e.g., mmlic_flag) may be signaled.

In some implementations, an LIC flag (e.g., lic_flag) may be signaled in the block level in the bitstream, a multi-model LIC flag (e.g., mmlic_flag) may then be signaled, and then mode index (e.g., lic_mode_idx) may be signaled.

In some implementations, an LIC flag (e.g., lic_flag) may be signaled in the block level in the bitstream, a mode index (e.g., lic_mode_idx) may then be signaled, multi-model LIC flag (e.g., mmlic_flag) may then be signaled, and then an adjustment parameter (e.g., slope parameter) may be signaled.

In some implementations, an LIC flag (e.g., lic_flag) may be signaled in the block level in the bitstream, multi-model LIC flag (e.g., mmlic_flag) may then be signaled, a mode index (e.g., lic_mode_idx) may then be signaled, and then an adjustment parameter (e.g., slope parameter) may be signaled.

In the legacy ECM implementation, subblock mode, such as affine mode, fetching the LIC template is based on the motion information (motion vector and/or reference index) of those subblocks located at the top boundary and left boundary of the current block. The complexity of fetching the reference template in the legacy ECM implementation may be high because it needs to fetch each sub-template. In the proposed method, the complexity of fetching the LIC reference template may be reduced.

Figures 13, 14:
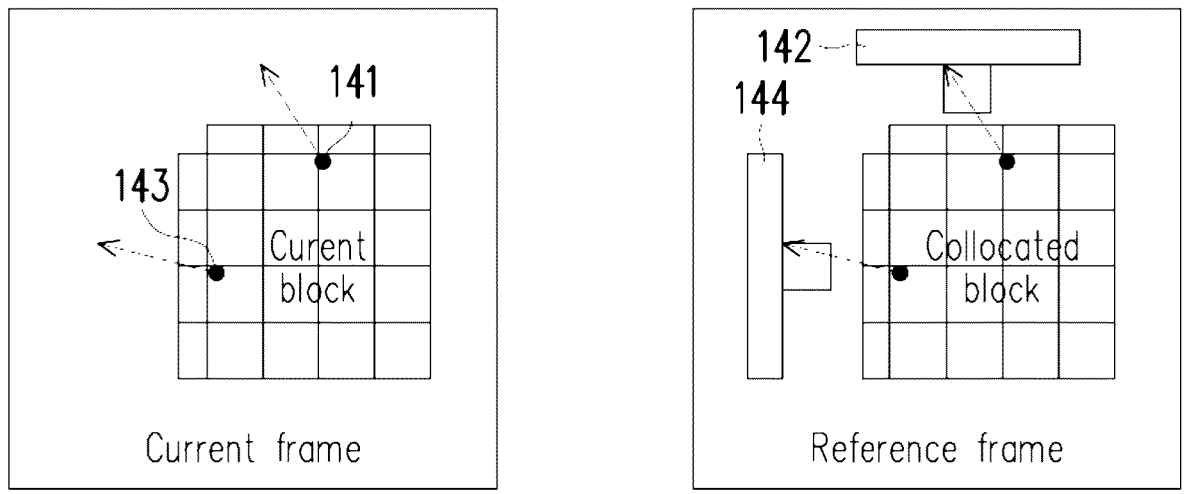
FIG. 13 is a flowchart illustrating an LIC template fetching method/process, in accordance with one or more example implementations of the present disclosure.
FIG. 14 is a schematic diagram that illustrates fetching LIC templates, in accordance with one or more example implementations of the present disclosure.

FIG. 13 is a flowchart illustrating an LIC template fetching method/process, in accordance with one or more example implementations of the present disclosure. Referring to FIG. 13, the decoder module fetches motion information of a sub-block unit containing the middle sample of the block unit (step S1310).

FIG. 14 is a schematic diagram that illustrates fetching LIC templates, in accordance with one or more example implementations of the present disclosure. In some implementations, only the motion information of the subblock in the current block containing the middle sample of the top boundary of the current block may be used to fetch the above reference template; and/or only the motion information of the subblock in the current block containing the middle sample of the left boundary of the current block may be used to fetch the left side reference template. As shown in FIG. 14, only one motion information of the subblock containing position 141/143 in the current block may be used to fetch the above/left side reference template 142/144.

Figure 15:
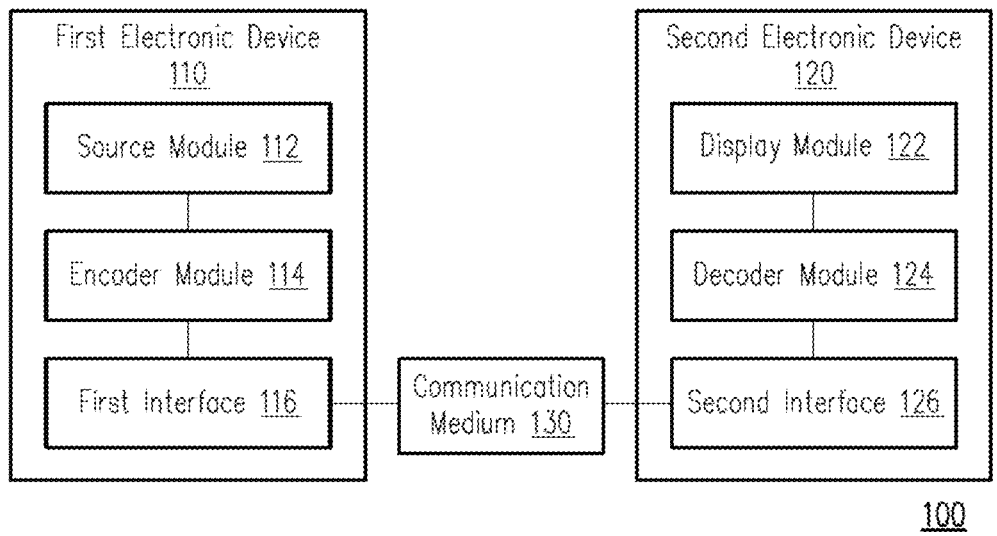
FIG. 15 is a block diagram illustrating a system having a first electronic device and a second electronic device for encoding and decoding video data, in accordance with one or more example implementations of the present disclosure.

FIG. 15 is a block diagram illustrating a system 100 having a first electronic device 110 and a second electronic device 120 for encoding and decoding video data, in accordance with one or more example implementations of the present disclosure. The system 100 includes a first electronic device 110, a second electronic device 120, and a communication medium 130. The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

In at least one implementation, the first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 15 merely illustrates one example of the first electronic device 110 and the second electronic device 120. The first electronic device 110 and second electronic device 120 may include more or fewer components than illustrated or have a different configuration of the various illustrated components.

In at least one implementation, the source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

In at least one implementation, the encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

In at least one implementation, the display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 16:
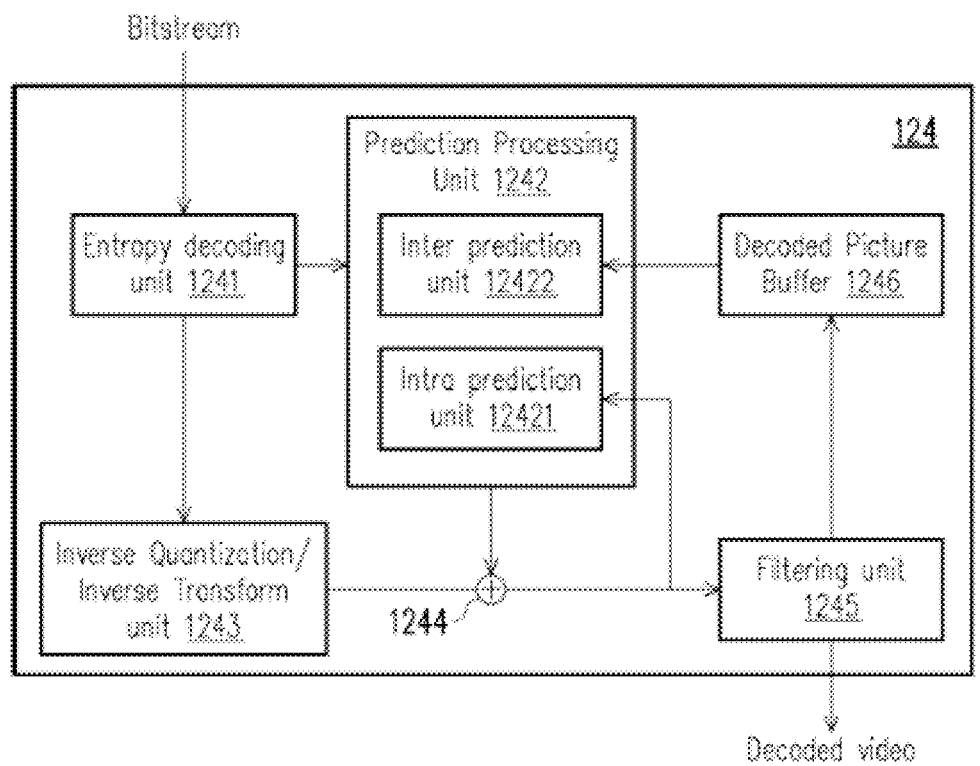
FIG. 16 is a block diagram illustrating a decoder module of the second electronic device illustrated in FIG. 15, in accordance with one or more example implementations of the present disclosure.

FIG. 16 is a block diagram illustrating a decoder module 124 of the second electronic device 120 illustrated in FIG. 15, in accordance with one or more example implementations of the present disclosure. The decoder module 124 may include an entropy decoder (e.g., an entropy decoding unit 1241), a prediction processor (e.g., a prediction processing unit 1242), an inverse quantization/inverse transform processor (e.g., an inverse quantization/inverse transform unit 1243), a summer (e.g., a summer 1244), a filter (e.g., a filtering unit 1245), and a decoded picture buffer (e.g., a decoded picture buffer 1246). The prediction processing unit 1242 further may include an intra prediction processor (e.g., an intra prediction unit 12421) and an inter prediction processor (e.g., an inter prediction unit 12422). The decoder module 124 receives a bitstream, decodes the bitstream, and outputs a decoded video.

The entropy decoding unit 1241 may receive the bitstream including multiple syntax elements from the second interface 126, as shown in FIG. 15, and perform a parsing operation on the bitstream to extract syntax elements from the bitstream. As part of the parsing operation, the entropy decoding unit 1241 may entropy decode the bitstream to generate quantized transform coefficients, quantization parameters, transform data, motion vectors, intra modes, partition information, and/or other syntax information.

In at least one implementation, the entropy decoding unit 1241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. In at least one implementation, the entropy decoding unit 1241 may provide the quantized transform coefficients, the quantization parameters, and the transform data to the inverse quantization/inverse transform unit 1243 and provide the motion vectors, the intra modes, the partition information, and other syntax information to the prediction processing unit 1242.

In at least one implementation, the prediction processing unit 1242 may receive syntax elements, such as motion vectors, intra modes, partition information, and other syntax information, from the entropy decoding unit 1241. The prediction processing unit 242 may receive the syntax elements including the partition information and divide image frames according to the partition information.

In at least one implementation, each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), sub-divisions thereof, and/or other equivalent coding units.

In at least one implementation, during the decoding process, the prediction processing unit 242 may receive predicted data including the intra mode or the motion vector for a current image block of a specific one of the image frames. The current image block may be the luminance block or one of the chrominance blocks in the specific image frame.

In at least one implementation, the intra prediction unit 12421 may perform intra-predictive coding of a current block unit relative to one or more neighboring blocks in the same frame, as the current block unit, based on syntax elements related to the intra mode in order to generate a predicted block. The intra mode may specify the location of reference samples selected from the neighboring blocks within the current frame. In at least one implementation, the intra prediction unit 12421 may reconstruct multiple chroma components of the current block unit based on multiple luma components of the current block unit when the multiple chroma components is reconstructed by the prediction processing unit 1242.

In at least one implementation, the intra prediction unit 12421 may reconstruct multiple chroma components of the current block unit based on the multiple luma components of the current block unit when the multiple luma components of the current block unit is reconstructed by the prediction processing unit 1242.

In at least one implementation, the inter prediction unit 12422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit may be a block determined to closely match the current block unit.

In at least one implementation, the inter prediction unit 12422 may receive the reference image block stored in the decoded picture buffer 1246 and reconstruct the current block unit based on the received reference image blocks.

In at least one implementation, the inverse quantization/inverse transform unit 1243 may apply inverse quantization and inverse transformation to reconstruct the residual block in the pixel domain. The inverse quantization/inverse transform unit 1243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loeve transform (KLT), a wavelet transform, an integer transform, a sub-band transform, or a conceptually similar transform.

In at least one implementation, the inverse transformation may convert the residual information from a transform domain, such as a frequency domain, back to the pixel domain, etc. The degree of inverse quantization may be modified by adjusting a quantization parameter.

In at least one implementation, the summer 1244 may add the reconstructed residual block to the predicted block provided by the prediction processing unit 1242 to produce a reconstructed block.

In at least one implementation, the filtering unit 1245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 1244.

The filtering unit 1245 may output the decoded video to the display module 122 or other video receiving unit after the filtering unit 1245 performs the filtering process for the reconstructed blocks of the specific image frame.

In at least one implementation, the decoded picture buffer 1246 may be a reference picture memory that stores the reference block to be used by the prediction processing unit 1242 in decoding the bitstream (e.g., in inter-coding modes). The decoded picture buffer 1246 may be formed by any one of a variety of memory devices, such as a dynamic random-access memory (DRAM), including synchronous DRAM (SDRAM), magneto-resistive RAM (MRAM), resistive RAM (RRAM), or other types of memory devices.

In at least one implementation, the decoded picture buffer 1246 may be on-chip with other components of the decoder module 124 or off-chip relative to those components.

Figure 17:
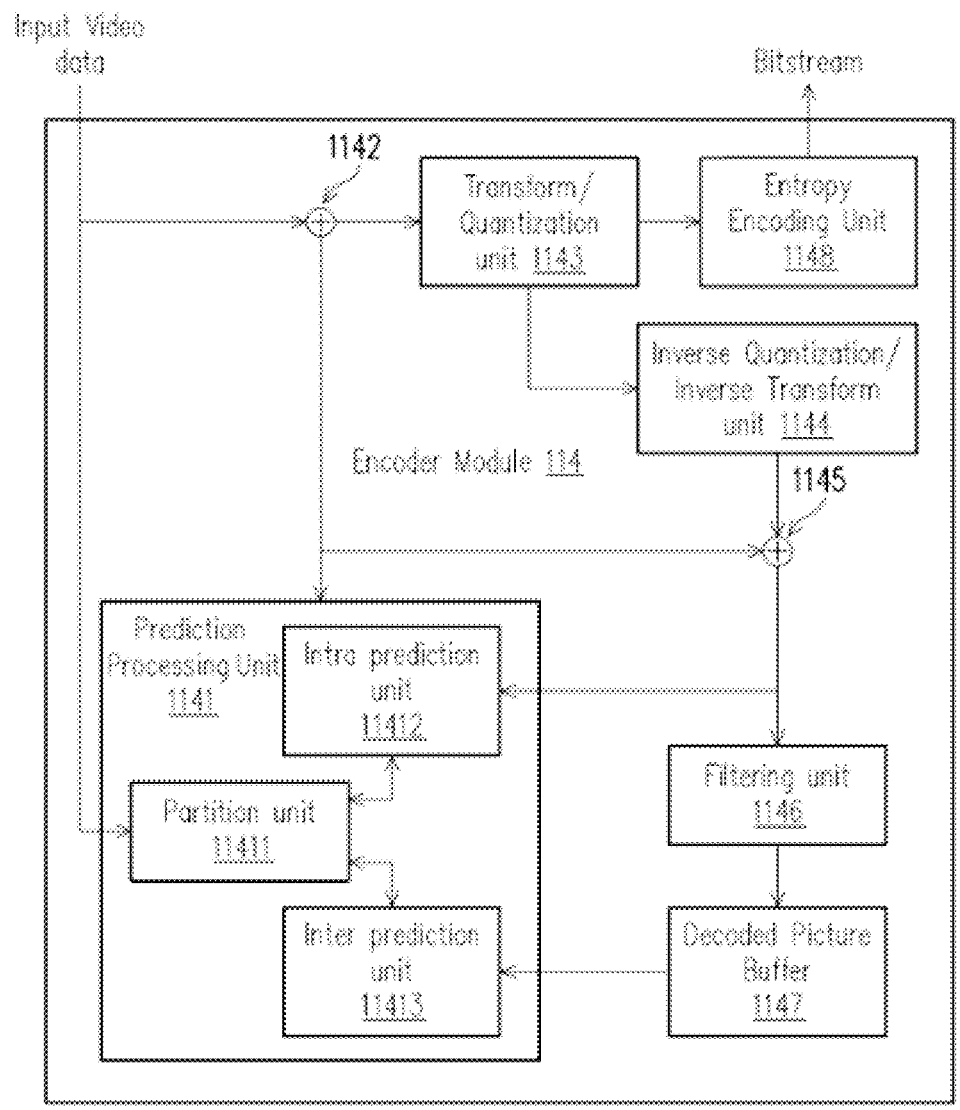
FIG. 17 is a block diagram illustrating an encoder module of the first electronic device illustrated in FIG. 15, in accordance with one or more example implementations of the present disclosure.

FIG. 17 is a block diagram illustrating an encoder module 114 of the first electronic device 110 illustrated in FIG. 15, in accordance with one or more example implementations of the present disclosure. The encoder module 114 may include a prediction processor (e.g., a prediction processing unit 1141), at least a first summer (e.g., a first summer 1142) and a second summer (e.g., a second summer 1145), a transform/quantization processor (e.g., a transform/quantization unit 1143), an inverse quantization/inverse transform processor (e.g., an inverse quantization/inverse transform unit 1144), a filter (e.g., a filtering unit 1146), a decoded picture buffer (e.g., a decoded picture buffer 1147), and an entropy encoder (e.g., an entropy encoding unit 1148). The prediction processing unit 1141 of the encoder module 114 may further include a partition processor (e.g., a partition unit 11411), an intra prediction processor (e.g., an intra prediction unit 11412), and an inter prediction processor (e.g., an inter prediction unit 11413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

In at least one implementation, the encoder module 114 may perform additional sub-divisions of the source video. It should be noted that the disclosed implementations are generally applicable to video coding regardless of how the source video is partitioned prior to and/or during the encoding.

In at least one implementation, during the encoding process, the prediction processing unit 1141 may receive a current image block of a specific one of the image frames. The current image block may be the luminance block or one of the chrominance blocks in the specific image frame.

The partition unit 11411 may divide the current image block into multiple block units. The intra prediction unit 11412 may perform intra-predictive coding of a current block unit relative to one or more neighboring blocks in the same frame, as the current block unit, in order to provide spatial prediction. The inter prediction unit 11413 may perform inter-predictive coding of the current block unit relative to one or more blocks in one or more reference image blocks to provide temporal prediction.

In at least one implementation, the prediction processing unit 1141 may select one of the coding results generated by the intra prediction unit 11412 and the inter prediction unit 11413 based on a mode selection method, such as a cost function. The mode selection method may be a rate-distortion optimization (RDO) process.

The prediction processing unit 1141 may determine the selected coding result and provide a predicted block corresponding to the selected coding result to the first summer 1142 for generating a residual block and to the second summer 1145 for reconstructing the encoded block unit. The prediction processing unit 1141 may further provide syntax elements, such as motion vectors, intra-mode indicators, partition information, and/or other syntax information, to the entropy encoding unit 1148.

In at least one implementation, the intra prediction unit 11412 may intra-predict the current block unit. The intra prediction unit 11412 may determine an intra prediction mode directed toward a reconstructed sample neighboring the current block unit in order to encode the current block unit.

In at least one implementation, the intra prediction unit 11412 may encode the current block unit using various intra prediction modes. The intra prediction unit 11412 of the prediction processing unit 1141 may select an appropriate intra prediction mode from the selected modes. The intra prediction unit 11412 may encode the current block unit using a cross-component prediction mode to predict one of the two chroma components of the current block unit based on the luma components of the current block unit. The intra prediction unit 11412 may predict a first one of the two chroma components of the current block unit based on the second of the two chroma components of the current block unit.

In at least one implementation, the inter prediction unit 11413 may inter-predict the current block unit as an alternative to the intra prediction performed by the intra prediction unit 11412. The inter prediction unit 11413 may perform motion estimation to estimate motion of the current block unit for generating a motion vector.

The motion vector may indicate a displacement of the current block unit within the current image block relative to a reference block unit within a reference image block. The inter prediction unit 11413 may receive at least one reference image block stored in the decoded picture buffer 1147 and estimate the motion based on the received reference image blocks to generate the motion vector.

In at least one implementation, the first summer 1142 may generate the residual block by subtracting the prediction block determined by the prediction processing unit 1141 from the original current block unit. The first summer 1142 may represent the component or components that perform this subtraction.

In at least one implementation, the transform/quantization unit 1143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 1143 may perform a scan of the matrix including the quantized transform coefficients. Alternatively, the entropy encoding unit 1148 may perform the scan.

In at least one implementation, the entropy encoding unit 1148 may receive multiple syntax elements from the prediction processing unit 1141 and the transform/quantization unit 1143 including a quantization parameter, transform data, motion vectors, intra modes, partition information, and/or other syntax information. The entropy encoding unit 1148 may encode the syntax elements into the bitstream.

In at least one implementation, the entropy encoding unit 1148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 15) or archived for later transmission or retrieval.

In at least one implementation, the inverse quantization/ inverse transform unit 1144 may apply inverse quantization and inverse transformation to reconstruct the residual block in the pixel domain for later use as a reference block. The second summer 1145 may add the reconstructed residual block to the prediction block provided by the prediction processing unit 1141 in order to produce a reconstructed block for storage in the decoded picture buffer 1147.

In at least one implementation, the filtering unit 1146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 1145.

In at least one implementation, the decoded picture buffer 1147 may be a reference picture memory that stores the reference block to be used by the encoder module 114 to encode video, such as in intra-coding or inter-coding modes. The decoded picture buffer 1147 may include a variety of memory devices, such as DRAM (e.g., including SDRAM), MRAM, RRAM, or other types of memory devices. The decoded picture buffer 1147 may be on-chip with other components of the encoder module 114 or off-chip relative to those components.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

The invention claimed is:

1. A method-non-transitory machine-readable medium of an electronic device storing one or more computer-executable instructions for decoding a bitstream, the one or more computer-executable instructions, when executed by at least one processor of the electronic device, causing the electronic device to:
   receive an image frame of the bitstream;
   determine a first mode from a plurality of local illumination compensation (LIC) modes;
   determine a first template of a block unit of the image frame and at least one second template of at least one reference block based on the first mode;
   determine a first model based on the first template and the at least one second template;
   obtain a slope adjustment parameter;
   adjust the first model based on the slope adjustment parameter; and
   modify a prediction illumination of the block unit of the image frame based on the adjusted first model.

2. The non-transitory machine-readable medium according to claim 1, wherein the one or more computer-executable instructions, when executed by the at least one processor, further cause the electronic device to:
   determine, from the bitstream, a slope adjustment enabled flag of the block unit to indicate whether the slope adjustment parameter for the LIC mode is enabled to be obtained for the block unit.

3. The non-transitory machine-readable medium according to claim 2, wherein the one or more computer-executable instructions, when executed by the at least one processor, further cause the electronic device to:
   determine, from the bitstream, an LIC flag of the block unit; and determine, based on the LIC flag, whether the slope adjustment enabled flag of the block unit is included in the bitstream.

4. The non-transitory machine-readable medium according to claim 3, wherein:
the LIC flag of the block unit further indicates whether the LIC mode is enabled for the block unit, and
when the LIC flag of the block unit is equal to one, the LIC mode is enabled for the block unit and the slope adjustment enabled flag of the block unit is included in the bitstream.

5. The non-transitory machine-readable medium according to claim 2, wherein: the slope adjustment enabled flag of the block unit is determined from the bitstream when the at least one reference block is determined based on the block unit using an advanced motion vector prediction (AMVP) mode.

6. The non-transitory machine-readable medium according to claim 1, wherein:
determining the first model further includes deriving a scaling factor and an offset value of the first model based on the first template and the at least one second template, and
adjusting the first model further includes adjusting the scaling factor and the offset value of the first model based on the slope adjustment parameter.

7. An electronic device for decoding a bitstream, the electronic device comprising:
at least one processor; and
one or more non-transitory computer-readable media coupled to the at least one processor and storing one or more computer-executable instructions that, when executed by the at least one processor, cause the electronic device to:
receive an image frame of the bitstream;
determine a first mode from a plurality of local illumination compensation (LIC) modes;
determine a first template of a block unit of the image frame and at least one second template of at least one reference block based on the first mode;
determine a first model based on the first template and the at least one second template;
obtain a slope adjustment parameter;
adjust the first model based on the slope adjustment parameter; and
modify a prediction illumination of the block unit of the image frame based on the adjusted first model.

8. The electronic device according to claim 7, wherein the one or more computer-executable instructions, when executed by the at least one processor, further cause the electronic device to:
determine, from the bitstream, a slope adjustment enabled flag of the block unit to indicate whether the slope adjustment parameter for the LIC mode is enabled to be obtained for the block unit.

9. The electronic device according to claim 8, wherein the one or more computer-executable instructions, when executed by the at least one processor, further cause the electronic device to:
determine, from the bitstream, an LIC flag of the block unit; and
determine, based on the LIC flag, whether the slope adjustment enabled flag of the block unit is included in the bitstream.

10. The electronic device according to claim 9, wherein:
the LIC flag of the block unit further indicates whether the LIC mode is enabled for the block unit, and
when the LIC flag of the block unit is equal to one, the LIC mode is enabled for the block unit and the slope adjustment enabled flag of the block unit is included in the bitstream.

11. The electronic device according to claim 8, wherein:
the slope adjustment enabled flag of the block unit is determined from the bitstream when the at least one reference block is determined based on the block unit using an advanced motion vector prediction (AMVP) mode.

12. The electronic device according to claim 7, wherein:
determining the first model further includes deriving a scaling factor and an offset value of the first model based on the first template and the at least one second template, and
adjusting the first model further includes adjusting the scaling factor and the offset value of the first model based on the slope adjustment parameter.

13. An electronic device for encoding video data, the electronic device comprising:
at least one processor; and
one or more non-transitory computer-readable media coupled to the at least one processor and storing one or more computer-executable instructions that, when executed by the at least one processor, cause the electronic device to:
receive an image frame of the video data;
determine a first mode from a plurality of local illumination compensation (LIC) modes;
determine a first template of a block unit of the image frame and at least one second template of at least one reference block based on the first mode;
determine a first model based on the first template and the at least one second template;
obtain a slope adjustment parameter;
adjust the first model based on the slope adjustment parameter; and
modify a prediction illumination of the block unit of the image frame based on the adjusted first model.

14. The electronic device according to claim 13, wherein the one or more computer-executable instructions, when executed by the at least one processor, further cause the electronic device to:
add, into a bitstream, a slope adjustment enabled flag of the block unit to indicate whether the slope adjustment parameter for the LIC mode is enabled to be obtained for the block unit.

15. The electronic device according to claim 14, wherein the one or more computer-executable instructions, when executed by the at least one processor, further cause the electronic device to:
add, further into the bitstream, an LIC flag of the block unit; and
determine, based on the LIC flag, whether the slope adjustment enabled flag of the block unit is added into the bitstream.

16. The electronic device according to claim 15, wherein:
the LIC flag of the block unit further indicates whether the LIC mode is enabled for the block unit, and
when the LIC flag of the block unit is equal to one, the LIC mode is enabled for the block unit and the slope adjustment enabled flag of the block unit is added in the bitstream.

17. The electronic device according to claim 14, wherein:
the slope adjustment enabled flag of the block unit is added into the bitstream when the at least one reference block is determined based on the block unit using an advanced motion vector prediction (AMVP) mode.

18. The electronic device according to claim 13, wherein:
determining the first model further includes deriving a scaling factor and an offset value of the first model based on the first template and the at least one second template, and
adjusting the first model further includes adjusting the scaling factor and the offset value of the first model based on the slope adjustment parameter.

* * * * *